United States Patent
Tsai

(10) Patent No.: US 6,394,213 B1
(45) Date of Patent: May 28, 2002

(54) POWER CLUTCH MECHANISM OF SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 69 days.

(21) Appl. No.: 09/610,353

(22) Filed: Jul. 5, 2000

(51) Int. Cl.⁷ ................................................ A63C 5/08
(52) U.S. Cl. ..................... 180/181; 180/221; 180/228; 180/298
(58) Field of Search .................... 180/181, 180, 180/205, 206, 207, 220, 221, 222, 227, 228, 218, 219, 298

(56) References Cited

U.S. PATENT DOCUMENTS

| | | | | |
|---|---|---|---|---|
| 1,191,287 A | * | 7/1916 | DeVaux | 180/219 |
| 2,173,956 A | * | 9/1939 | Roberts | 180/205 |
| 4,014,402 A | * | 3/1977 | Muto | 180/206 |
| 4,175,630 A | * | 11/1979 | Fleisher et al. | 180/221 X |
| 4,200,164 A | * | 4/1980 | Pearne | 180/206 |
| 5,078,227 A | * | 1/1992 | Becker | 180/221 |
| 5,388,659 A | * | 2/1995 | Pepe | 180/219 |
| 6,095,274 A | * | 8/2000 | Patmont | 180/181 |
| 6,148,942 A | * | 11/2000 | Mackert, Sr. | |
| 6,227,324 B1 | * | 5/2001 | Sauve | 180/228 |
| 6,273,205 B1 | * | 8/2001 | Tsai | 181/181 |

* cited by examiner

Primary Examiner—Brian L. Johnson
Assistant Examiner—Bryan Fischmann
(74) Attorney, Agent, or Firm—Browdy and Neimark

(57) ABSTRACT

A scooter is provided with a power clutch mechanism enabling the scooter to be moved by a motor of the mechanism, or by pushes made by one foot of a rider of the scooter. The mechanism has a drive wheel mounted on an output shaft of the motor which is mounted on a suspension seat. The suspension seat is pivoted to the base of the scooter such that the suspension seat is urged by an urging member of the mechanism to enable the drive wheel to disengage the rear wheel of the scooter, and that the suspension seat is not urged by the urging member to enable the drive wheel to engage the rear wheel of the scooter.

4 Claims, 5 Drawing Sheets

POWER CLUTCH MECHANISM OF SCOOTER

FIELD OF THE INVENTION

The present invention relates generally to a scooter, and more particularly to a power clutch mechanism of the scooter consisting of a low, narrow footboard with a wheel at each end, and a raised handlebar for steering. The scooter is a youth's plaything, which can be also moved by a series of pushes made by one foot against the ground.

BACKGROUND OF THE INVENTION

As shown in FIG. 1, a scooter power clutch mechanism of the prior art comprises a motor 1, which is pivoted to a rear fork 2 of the scooter in conjunction with a spring 3 and a steel cable 6. The spring 3 is connected at one end with the motor 1, and at other end with the rear fork 2. The steel cable 6 is connected at one end with the motor 1, and at other end with a handle 8 which is pivotally fastened with a handlebar 7. The output shaft 4 of the motor 1 is engaged with a rear wheel 5 by means of the spring force of the spring 3, thereby driving the rear wheel 5 to move the scooter. As the handle 8 is activated to cause the steel cable 6 to overcome the spring force of the spring 3, the motor 1 is caused to turn counterclockwise for a predetermined angle, thereby resulting in the disengagement of the output shaft 4 of the motor 1 with the rear wheel 5. The scooter can be moved by a series of pushes made by one foot of a rider against the ground, with the rider's hand holding the handle 8 in a steady manner. It is conceivably tiresome for a youngster to keep holding the handle 8 while she or he is trying to move the scooter forward by a series of pushes made by her or his foot against the ground. In addition, the scooter power clutch mechanism of the prior art does not operate with precision.

SUMMARY OF THE INVENTION

The primary objective of the present invention is to provide a scooter with a reliable power clutch mechanism.

It is another objective of the present invention to provide a scooter with a power clutch mechanism which can be easily operated.

The power clutch mechanism of the present invention comprises a power unit, a resilient member, and an urging member. The power unit is formed of a suspension seat, a motor mounted on the suspension seat which is fastened pivotally with the base board of the scooter, and a drive wheel mounted on the output shaft of the motor such that the drive wheel is engaged with the rear wheel of the scooter. The resilient member is fastened at both ends with the suspension seat and the rear fork of the scooter. The urging member is fastened pivotally at one end with the rear fork such that other end of the urging member detachably urges the suspension seat. The drive wheel is disengaged with the rear wheel of the scooter at such time when the suspension seat is urged by the urging member. The drive wheel is engaged with the rear wheel of the scooter at the time when the suspension seat is not urged by the urging member. The scooter can be thus moved by motor, or foot of a rider.

DETAILED DESCRIPTION OF THE INVENTION

Figure 1:
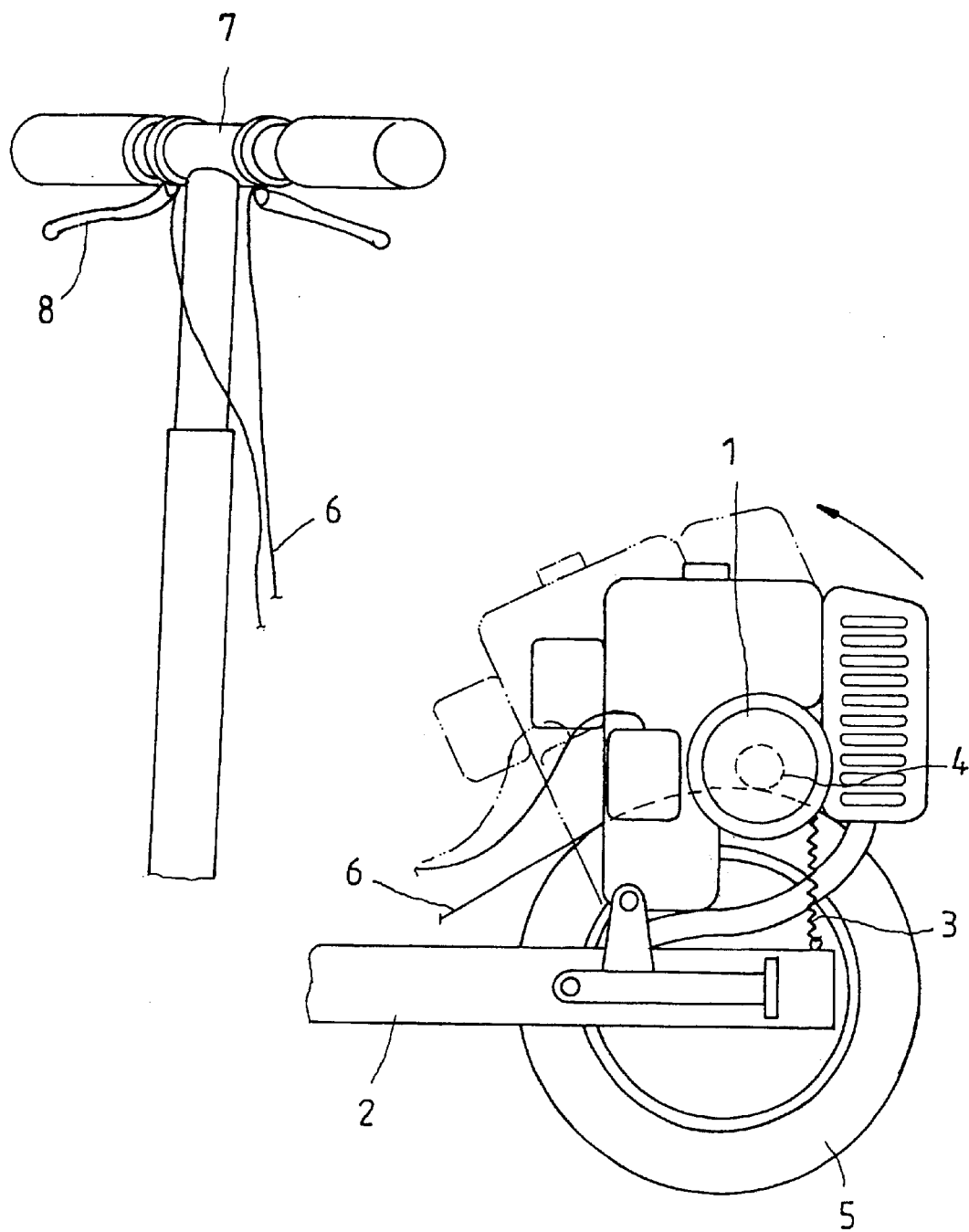
FIG. 1 shows a schematic view of a scooter power clutch mechanism of the prior art.
Figure 2:
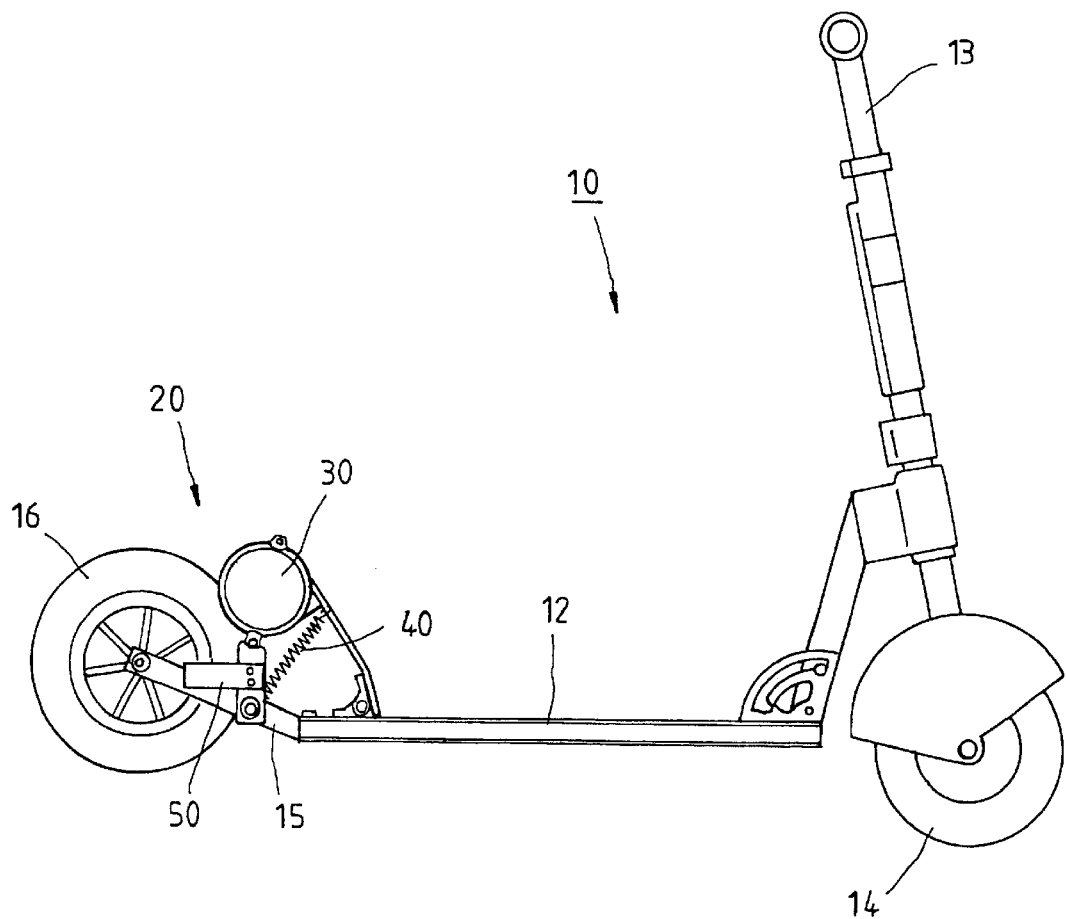
FIG. 2 shows a side view of a scooter of a first preferred embodiment of the present invention.

As shown in FIG. 2, a power clutch mechanism 20 of the first preferred embodiment of the present invention is mounted on a scooter 10 comprising a base 12, a handlebar frame 13 pivoted to the front end of the base 12, a front wheel 14 pivoted to the bottom end of the handlebar frame 13, two rear forks 15 extending from the rear end of the base 12, and a rear wheel 16 pivoted to the rear forks 15.

Figure 3:
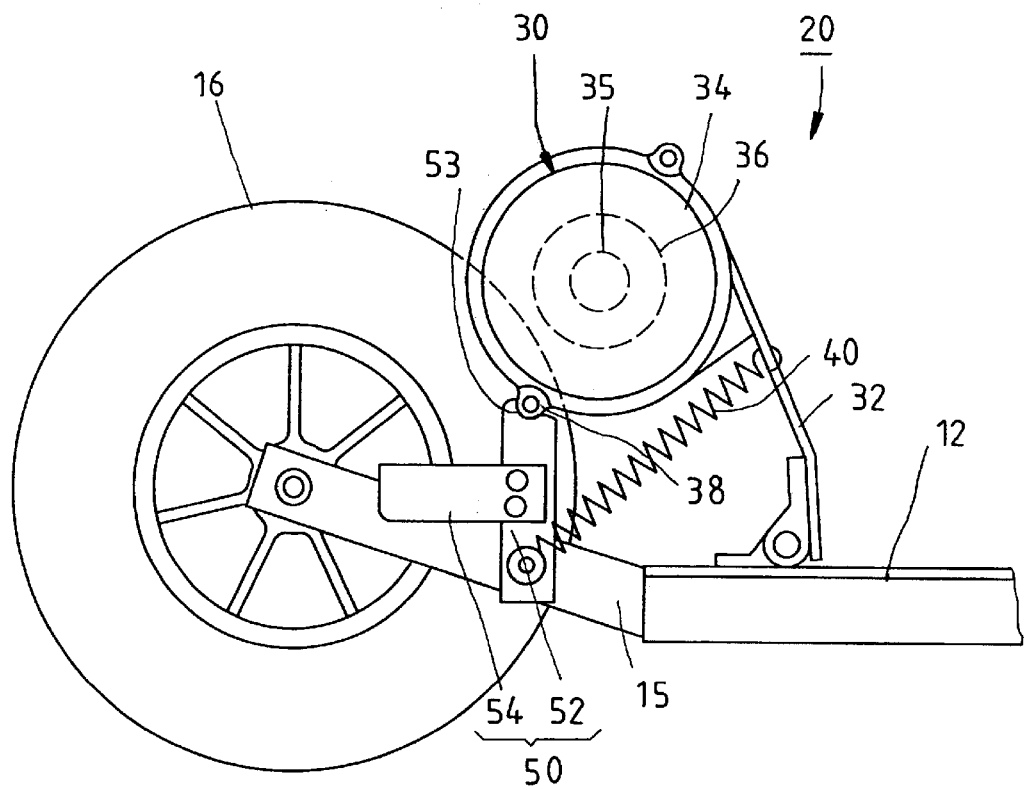
FIG. 3 shows a schematic view of a first state of the first preferred embodiment of the present invention.
Figure 4:
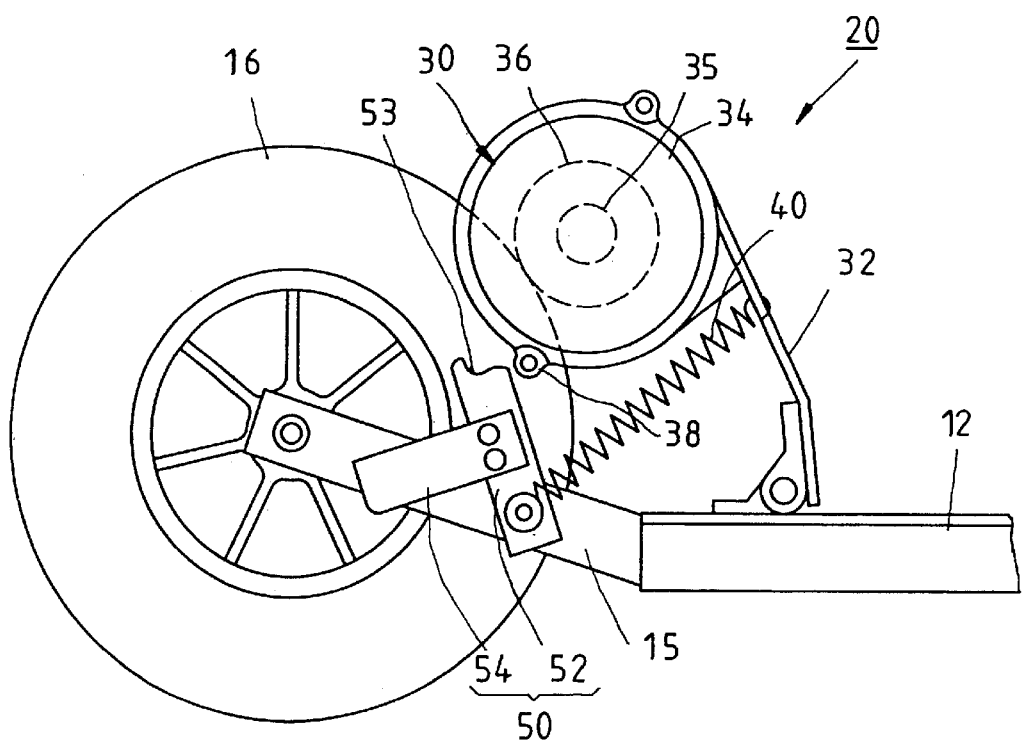
FIG. 4 shows a schematic view of a second state of the first preferred embodiment of the present invention.

As shown in FIGS. 3 and 4, the power clutch mechanism 20 comprises a power unit 30, a resilient member 40, and an urging member 50.

The power unit 30 is formed of a suspension seat 32 pivoted at the bottom end with the base 12, a motor 34 mounted on the top end of the suspension seat 32, and a drive wheel 36 mounted on the output shaft 35 of the motor 34. The drive wheel 36 has a recessed rim which is engaged with the rim of the rear wheel 16. The suspension seat 32 is provided with a protruded portion 38 corresponding in location to the bottom end of the motor 34.

The spring (resilient member) 40 is fastened at both ends with the suspension seat 32 and the rear forks 15. The suspension seat 32 is driven by the spring force of the spring 40 to turn counterclockwise, thereby enabling the drive wheel 36 to be in an intimate contact with the rear wheel 16.

The urging member 50 is formed of an upright portion 52 pivoted at the bottom end with the rear forks 15, and a horizontal portion 54 extending from the center of the upright portion 52. The upright portion 52 is provided at the top end with a slot 53 into which the protruded portion 38 of the suspension seat 32 is inserted. The horizontal portion 54 is movable.

As shown in FIG. 4, the horizontal portion 54 of the urging member 50 is turned by hand in the counterclockwise direction so as to cause the urging member 50 to be separated from the suspension seat 32. In the meantime, the suspension seat 32 is pulled by the spring 40 to enable the drive wheel 36 to engage the rear wheel 16, which is then driven by the power of the motor 34 to move the scooter 10 forward.

The scooter 10 can be also moved by foot of a rider of the scooter 10. The urging member 50 is first turned clockwise to cause the upright portion 52 of the urging member 50 to urge the suspension seat 32 such that the protruded portion 38 is inserted into the slot 53, as shown in FIG. 3. In the meantime, the suspension seat 32 turns clockwise. The drive wheel 36 is disengaged with the rear wheel 16. As a result, the rear wheel 16 can not be driven by the motor 34. The scooter 10 can be moved by a series of pushes made by one foot against the ground.

The power operation of the scooter 10 can be easily switched to the manual operation by turning manually the urging member 50 once. In addition, the precise disengagement of the drive wheel 36 with the rear wheel 16 of the scooter 10 is attained by the retention of the protruded portion 38 in the slot 53. It is therefore readily apparent that the present invention has overcome the drawbacks of the scooter power clutch mechanism of the prior art.

Figure 5:
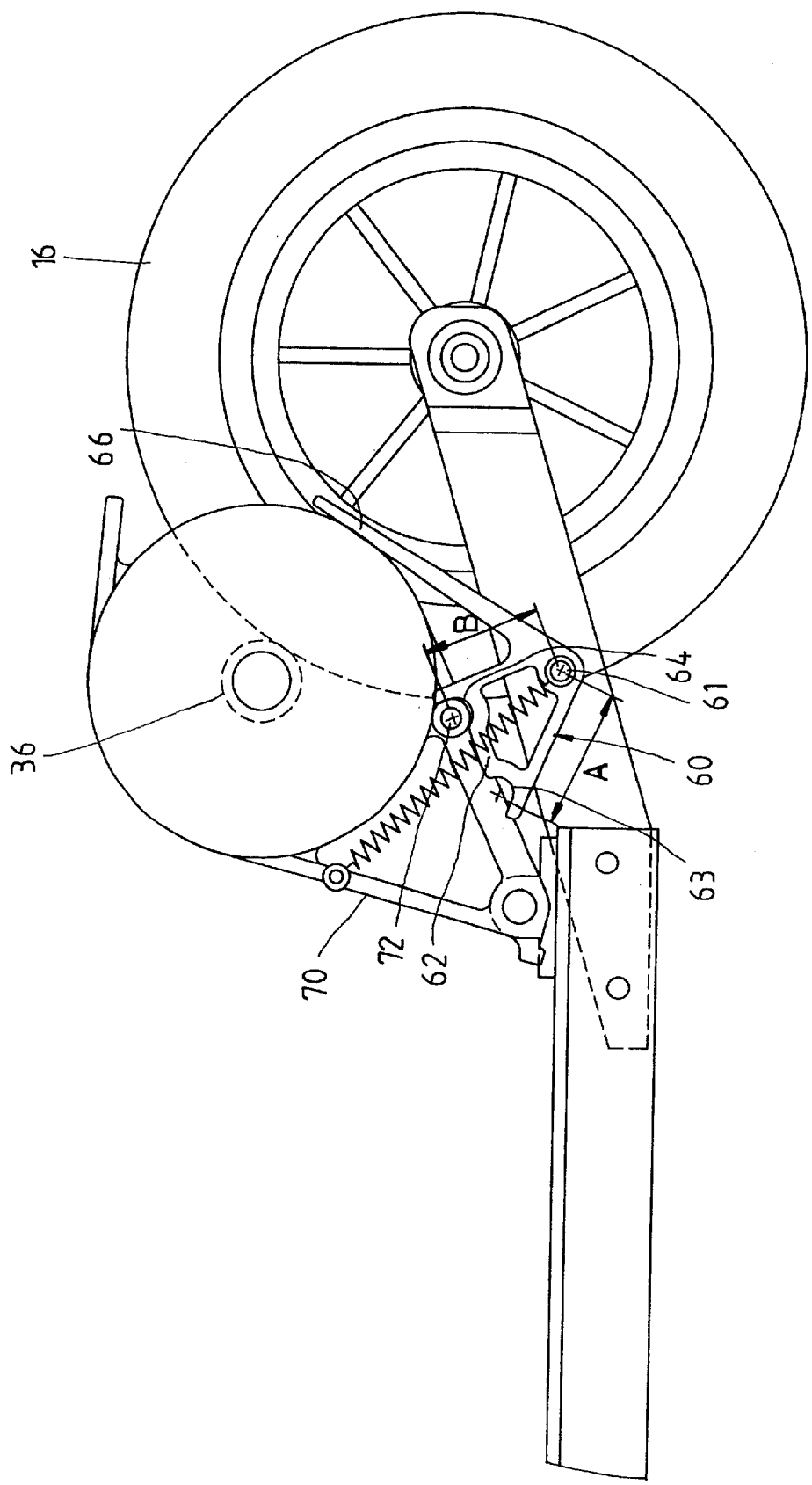
FIG. 5 shows a schematic view of a first state of a second preferred embodiment of the present invention.
Figure 6:
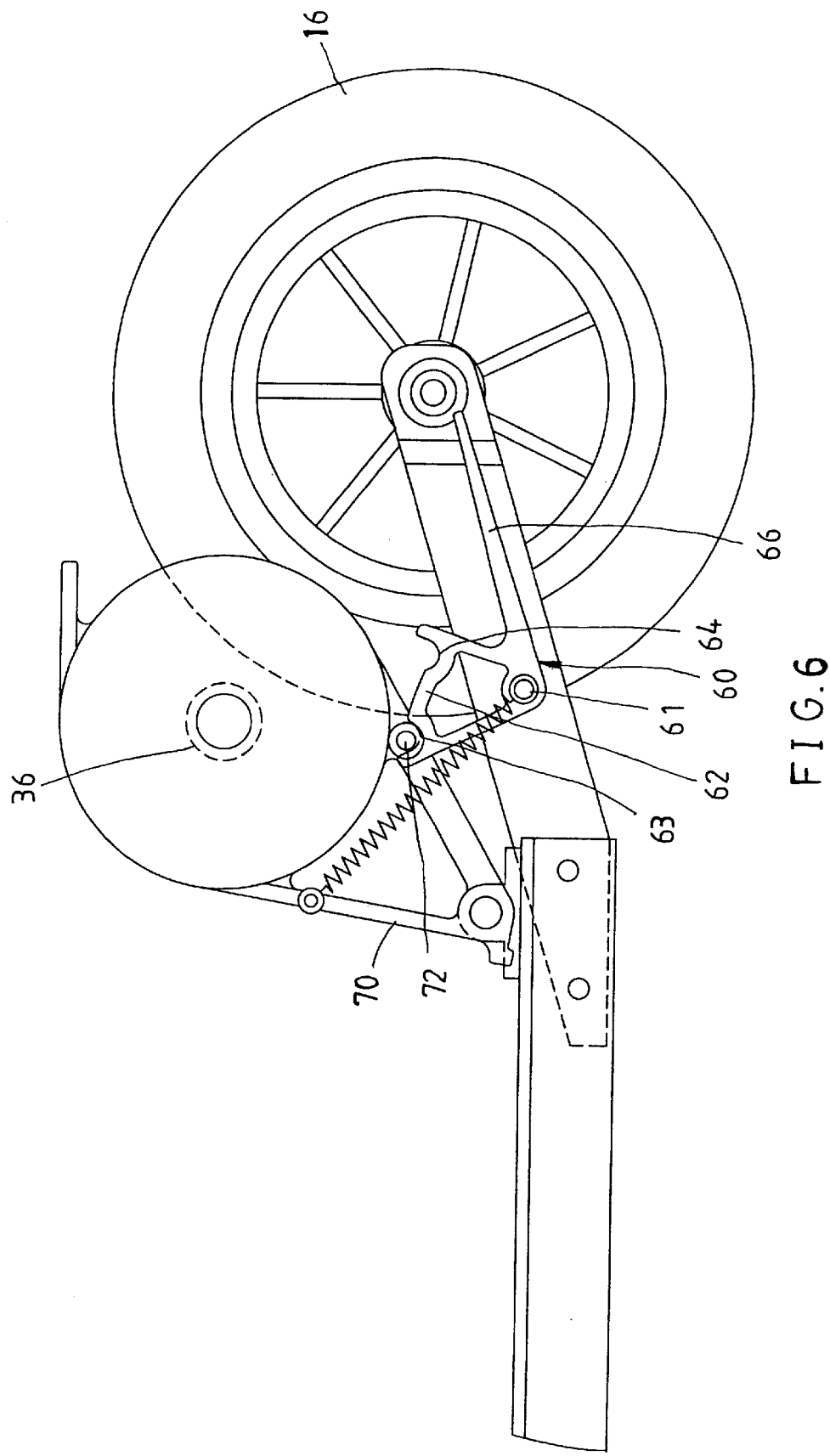
FIG. 6 shows a schematic view of a second state of the second preferred embodiment of the present invention.

As shown in FIGS. 5 and 6, a scooter power clutch mechanism of the second preferred embodiment of the present invention is basically similar in construction to that of the first preferred embodiment described above, with the difference being that the former comprises an urging member 60 which is formed of an insertion portion 62 and a grip portion 66. The insertion portion 62 is of an arcuate construction and is provided at both ends thereof with a first slot 63 and a second slot 64. The distance A between the first slot 63 and the pivoting point 61 is greater than the distance B between the second slot 64 and the pivoting point 61. The suspension seat 70 of the scooter is provided with a pillar 72 extending horizontally. When the pillar 72 of the suspension seat 70 is inserted into the first slot 63, the suspension seat 70 is urged by the urging member 60, thereby resulting in the disengagement of the drive wheel 36 with the rear wheel 16, as shown in FIG. 6. On the other hand, when the pillar 72 of the suspension seat 70 is inserted into the second slot 64, the suspension seat 70 is not urged by the urging member 60 and is exerted on by the spring force of the resilient member 40, thereby enabling the drive wheel 36 to be engaged with the rear wheel 16, as shown in FIG. 5. The grip portion 66 is intended to facilitate the turning of the urging portion 60 with the hand.

What is claimed is:

1. A power clutch mechanism of a scooter consisting of a base, a handlebar frame, a front wheel, at least one rear fork, and a rear wheel, said power clutch mechanism comprising:

a power unit formed of a suspension seat pivoted at one end to the base of the scooter, a motor mounted on said suspension seat and provided with an output shaft, and a drive wheel mounted on said output shaft of said motor such that said drive wheel is able to engage the rear wheel of the scooter;

opposite ends of a resilient member respectively fastened to said suspension seat and the rear fork of the scooter such that said resilient member provides a spring force to engage said drive wheel intimately with the rear wheel of the scooter; and an urging member pivoted at a first end to the rear fork of the scooter such that a second end of said urging member is able to urge said suspension seat;

said drive wheel being disengaged from the rear wheel of the scooter at such a time when said suspension seat is urged by said urging member, said drive wheel being engaged with the rear wheel of the scooter at such time when said suspension seat is not urged by said urging member; and wherein said second end of said urging member is provided with a slot; wherein said suspension seat is provided with a protruded portion whereby said protruded portion is received in said slot of said urging member at the time when said suspension seat is urged by said urging member.

2. The power clutch mechanism as defined in claim 1, wherein said resilient member is a spring.

3. A power clutch mechanism of a scooter consisting of a base, a handlebar frame, a front wheel, at least one rear fork, and a rear wheel, said power clutch mechanism comprising:

a power unit formed of a suspension seat pivoted at one end to the base of the scooter, a motor mounted on said suspension seat and provided with an output shaft, and a drive wheel mounted on said output shaft of said motor such that said drive wheel is able to engage the rear wheel of the scooter;

opposite ends of a resilient member respectively fastened to said suspension seat and the rear fork of the scooter such that said resilient member provides a spring force to engage said drive wheel intimately with the rear wheel of the scooter; and an urging member pivoted at a first end to the rear fork of the scooter such that a second end of said urging member is able to urge said suspension seat;

said drive wheel being disengaged from the rear wheel of the scooter at such time when said suspension seat is urged by said urging member, said drive wheel being engaged with the rear wheel of the scooter at such time when said suspension seat is not urged by said urging member; and wherein said suspension seat is provided with a pillar; wherein said second end of said urging member is provided with a first slot and a second slot; wherein said suspension seat is urged by said urging member when said pillar of said suspension seat is received in said first slot of said urging member; wherein said suspension seat is not urged by said urging member when said pillar of said suspension seat is received in said second slot of said urging member.

4. The power clutch mechanism as defined in claim 3, wherein said resilient member is a spring.

\* \* \* \* \*